United States Patent [19]

Katayama et al.

[11] 4,240,524
[45] Dec. 23, 1980

[54] OIL FLOW CONTROL DEVICE FOR POWER TRANSMISSIONS

[75] Inventors: Nobuaki Katayama; Hideaki Koga, both of Toyoto, Japan

[73] Assignee: Toyota Jidosha Kogyo Kabushiki Kaisha, Aichi, Japan

[21] Appl. No.: 974,227

[22] Filed: Dec. 29, 1978

[30] Foreign Application Priority Data

Aug. 2, 1978 [JP] Japan .......................... 53/106242[U]

[51] Int. Cl.³ .............................................. F01M 9/06
[52] U.S. Cl. .................................... 184/6.12; 74/467; 184/11 R; 184/13 R
[58] Field of Search ...................... 184/6.11 R, 6.13 R, 184/6.12, 1.5, 6.3, 106; 74/467, 710

[56] References Cited

U.S. PATENT DOCUMENTS

| | | | |
|---|---|---|---|
| 1,024,579 | 4/1912 | Huff | 184/13 R |
| 1,436,913 | 11/1922 | Seaholm | 184/11 R |
| 1,459,815 | 6/1923 | Belden | 184/11 R |
| 3,065,822 | 11/1962 | McAfee et al. | 184/11 R X |
| 3,441,106 | 4/1969 | Taylor et al. | 184/13 R X |
| 3,908,797 | 9/1975 | Schnepp | 184/1.5 |

Primary Examiner—David H. Brown
Attorney, Agent, or Firm—Armstrong, Nikaido, Marmelstein & Kubovcik

[57] ABSTRACT

A power transmission unit comprises a transmission casing shaped to conform with a change-speed gearing contained therein, the change-speed gearing including an output mainshaft rotatably supported from the rear end wall of the casing, and an extension housing secured in a fluid-tight manner to the rear end wall of the casing to form a lubricant chamber in open communication with the interior of the casing through the upper portion of the wall. In the transmission unit, an oil flow control device is provided in the bottom wall of the transmission casing to transfer lubricating oil into and from the lubricant chamber.

8 Claims, 4 Drawing Figures

OIL FLOW CONTROL DEVICE FOR POWER TRANSMISSIONS

BACKGROUND OF THE INVENTION

The present invention relates to power transmission units for motor vehicles.

Transmission units are known of the type which comprises a transmission casing shaped to conform with a change-speed gearing contained therein, the change-speed gearing including an output mainshaft rotatably supported from an upright end wall of the casing, and an extension housing secured in a fluid-tight manner at its upright front seating face to the upright end wall to contain one end of the mainshaft extending therein from the upright end wall, the extension housing forming therein a lubricant chamber in open communication with the interior of the casing through the upper portion of the upright end wall.

In operation of the transmission units as described above, lubricating oil in the transmission casing is picked up by rotation of the change-speed gearing and flows into the lubricant chamber through the upper portion of the upright end wall. Thus, the lubricating oil is stored in the lubricant chamber to lubricate component parts assembled within the extension housing. Although the transmission casing is provided with a drain plug to drain off waste lubricating oil and with a filler plug to feed in fresh oil, the waste lubricating oil in the extension housing may not be drained off due to closed state of the upright end wall, and the fresh oil may also not be supplied into the lubricant chamber at the initial stage of operation.

SUMMARY OF THE INVENTION

It is, therefore, a primary object of the present invention to provide an improved transmission unit in which an oil flow control device is provided in the bottom wall of the transmission casing adjacent to the extension housing to transfer lubricating oil into and from the extension housing.

According to the present invention there is provided a transmission unit comprising:

a transmission casing shaped to conform with a change-speed gearing contained therein, the change-speed gearing including an output mainshaft rotatably supported from an upright end wall of the casing; and an extension housing secured in a fluid-tight manner at its upright front seating face to the upright end wall to contain one end of the mainshaft extending therein from the upright end wall, the extension housing forming therein a lubricant chamber in open communication with the interior of the casing through the upper portion of the upright end wall;

there being formed in the bottom wall of the transmission casing a cavity which is open toward the lubricant chamber, a through hole across the cavity to open to lubricant chamber toward the interior of the casing and the exterior therethrough, and a plug element coupled with the through hole in a fluid-tight manner to close the through hole, whereby when the plug element is partly released outwardly, the lubricant chamber is communicated with the interior of the casing through the cavity and a part of the through hole.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
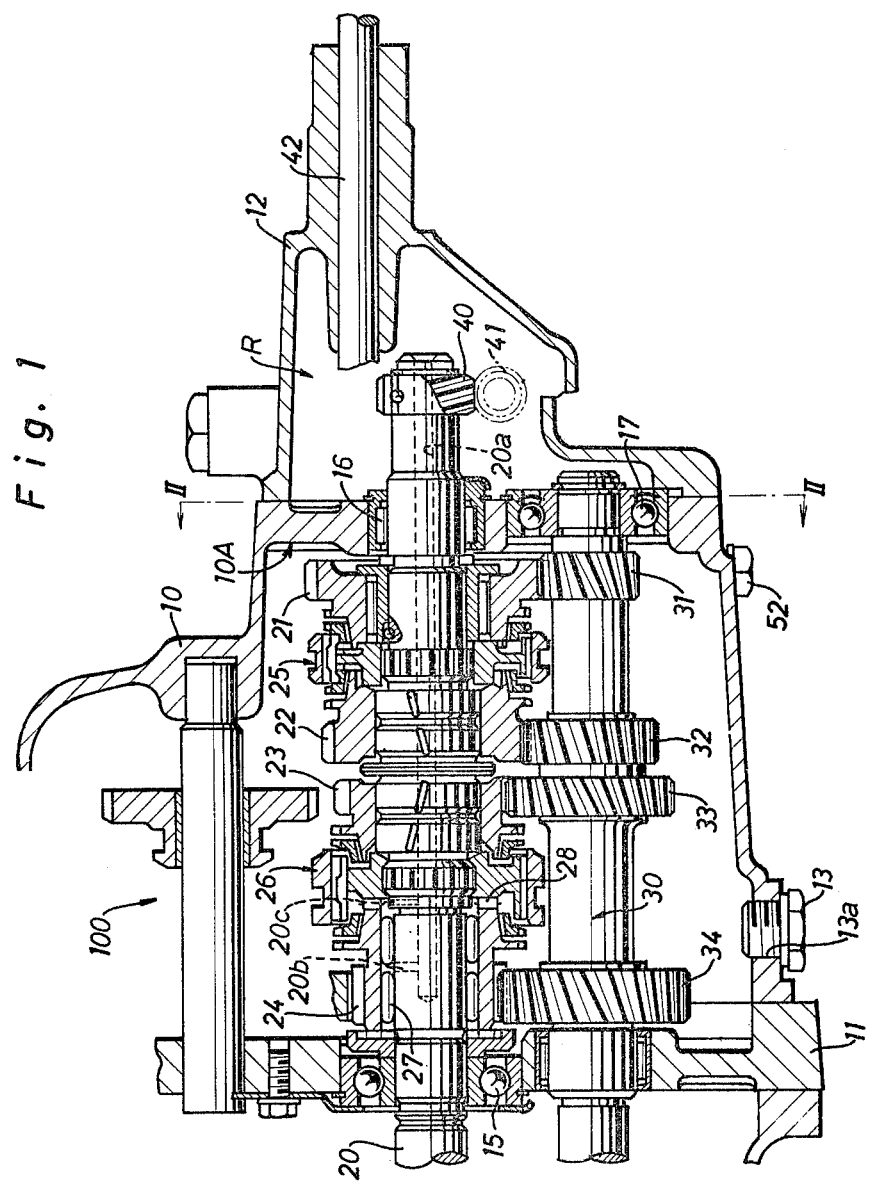
FIG. 1 is a sectional view of a transmission unit in accordance with the present invention.
Figure 2:
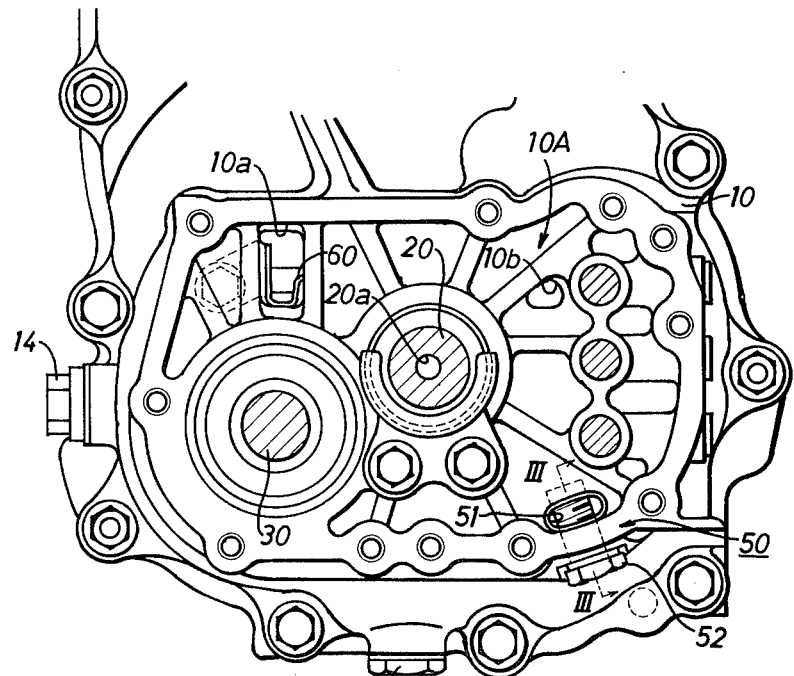
FIG. 2 is a front view taken along the plane of line II—II in FIG. 1, showing an upright rear end wall of a transmission casing of the unit.

Referring now to the drawings, in particular to FIG. 1, there is illustrated a transmission casing 10 shaped to conform with a change-speed gearing 100 contained therein. The transmission casing 10 has an upright rear end wall 10A and is secured in a fluid-tight manner at its upright front seating face to an upright intermediate plate 11. An extension housing 12 is secured in a fluid-tight manner at its front seating face to the upright rear end wall 10A of casing 10 to form a lubricant chamber R therein. The transmission casing 10 is provided at its bottommost portion with a drain port 13a which is closed by a drain plug 13 in a fluid-tight manner. As shown in FIG. 2, the casing 10 is also provided with a filler plug 14 which is threaded into the side wall of casing 10 to close a filler port in fluid-tight manner. The upright rear end wall 10A of casing 10 is formed at its upper portion with first and second through holes 10a and 10b respectively opening toward the interior of lubricant chamber R. Within casing 10, a predetermined amount of lubricating oil is stored to dip therein lower portions of four counter-gears 31–34 on a countershaft 30 of change-speed gearing 100.

The change-speed gearing 100 comprises an output mainshaft 20 which is journalled at the front hand thereof by a ball bearing 15 from the intermediate plate 11 and is journalled at the rear hand thereof by a semi-sealed needle roller bearing 16 from the casing 10. The mainshaft 20 is also located above the liquid surface of lubricating oil stored within the casing 10 and extends at its rear end into the lubricant chamber R. First, second, third and fourth gears 21, 22, 23 and 24 are rotatably carried on the mainshaft 20 and respectively meshed with the counter-gears 31, 32, 33 and 34 on the countershaft 30. The fourth gear 24 is adapted as an input gear and is supported by a dual needle bearing 27 on the mainshaft 20. The countershaft 30 is journalled at the front hand thereof by a needle roller bearing from the intermediate plate 11 and is journalled at the rear hand thereof by a sealed ball bearing 17.

The selection of gear ratios in the change-speed gearing 100 is effected by a shifting mechanism (not shown) which is operatively connected to a 1–2 shift synchronizer 25 and to a 3–4 shift synchronizer 26. The 1–2 shift synchronizer 25 is carried on the mainshaft 20 between the first and second gears 21 and 22 to establish synchronism in a driving connection between the mainshaft 20 and the first or second gear. The 3–4 shift synchronizer 26 is carried on the mainshaft 20 between the third and fourth gears 23 and 24 to establish synchronism in a driving connection between the mainshaft 20 and the third or fourth gear. The synchronizer 26 further includes a thrust bearing 28 located between the third and fourth gears 23 and 24.

To supply lubricating oil to the dual needle bearing 27 and the thrust bearing 28, the mainshaft 20 is provided therethrough with an axial oil passage 20a which is opened at its rear end into the lubricant chamber R and at its front portion toward the needle bearing 27 and the thrust bearing 28 through radial holes 20b, 20c. As is seen in FIG. 2, the rear end wall 10A of casing 10 is provided with an oil receiver 60 which is located above the first counter-gear 31 and surrounds the lower and left-side opening edges of the first through hole 10a. In operation of the change-speed gearing 100, the oil receiver 60 serves to collect lubricating oil picked up by rotation of the gears 21, 31 and to transfer the lubricating oil into the lubricant chamber R through the hole 10a. Thus, the lubricating oil is stored within the lubricant chamber R due to sealing feature of the bearings 16, 17 to lubricate meshing portions of a drive gear 40 and a driven gear 41 and thrust portions of a control shaft 42 for the shifting mechanism. The drive gear 40 is fixed to the rear end of mainshaft 20, and the driven gear 41 is meshed with the drive gear 40 to drive a speedometer for the vehicle. The stored lubricating oil is also supplied through the axial passage 20a and radial holes 20b, 20c to lubricate the needle and thrust bearings 27 and 28.

Figure 3:
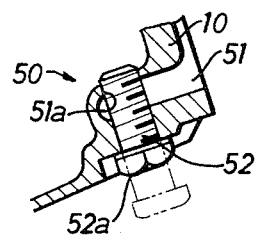
FIG. 3 is a sectional view taken along the plane of line III—III of FIG. 2.

In FIGS. 2 and 3, there is illustrated an oil flow control device 50 which is located adjacent to the rear end wall 10A of casing 10 to provide an oil communication between the casing 10 and the extension housing 12 at their bottoms. The oil flow control device 50 comprises a cavity 51 formed in the bottom wall of casing 10 and a vertical threaded hole 51a provided through the bottom wall of casing 10 to open the cavity 51 toward the interior of casing 10 and the exterior. The cavity 51 opens into the lubricant chamber R, and the vertical hole 51a is closed by a threaded plug 52 coupled therein to block the oil communication between the casing 10 and the housing 12. In addition, the cavity 51 is formed during the casting process of casing 10, and the vertical threaded hole 51a is formed by drilling through the bottom wall of casing 10.

In use of a transmission unit having the above-described construction, the plug 52 is fully threaded into the vertical hole 51a in a fluid-tight manner to block the oil communication between the casing 10 and the housing 12 at their bottoms. During operation of the change-speed gearing 100, the lubricating oil in casing 10 is picked up by rotation of the respective gears on the mainshaft 20 and the countershaft 30. Then, the picked-up lubricating oil splashes onto the journal portions exposed in casing 10 and is collected by the oil receiver 60 to flow into the lubricant chamber R through hole 10a. Subsequently, the level of lubricating oil in housing 12 rises up to the lower opening edge of hole 10a. Thus, the stored lubricating oil serves to lubricate the meshing portions of the gears 40, 41 and the control shaft 42 and is also supplied through the axial passage 20a and radial holes 20b, 20c to lubricate both the bearings 27 and 28.

To exchange waste lubricating oil with fresh oil, the drain plug 13 is removed to open the drain port 13a, and as shown by an imaginary line in FIG. 3, the plug 52 is partly released to communicate the lubricant chamber R with the interior of casing 10 through the cavity 51. Then, the waste oil in casing 10 is drained off through the drain port 13a, and subsequently the waste oil in lubricant chamber R flows into the casing 10 through the cavity 51. In this instance, if the filler plug 14 is removed to open the filler port, the drain of waste oil will be accelerated. In addition, the plug 52 may be removed to accelerate the drain of waste oil from the housing 12.

After exhaustion of the waste oil, the drain port 13a if fully closed by the drain plug 13, and an amount of fresh oil is fed into the casing 10 from the filler port. Then, the fresh oil flows along the bottom of casing 10 and partly flows into the lubricant chamber R through the cavity 51 to cause equality of the level of fresh oil in casing 10 and housing 12. After each of the casing 10 and housing 12 if filled with fresh oil, the plug 52 is fully threaded into the vertical hole 51a to block the oil communication between the casing 10 and the housing 12, and the filler plug 14 is threaded to close the filler port.

When the change-speed gearing 100 is operated after filling of the fresh oil, the level of fresh oil in the lubricant chamber R rises up to the lower opening edge of hole 10a in a short period of time at the initial stage of operation. Thus, the fresh oil serves to lubricate the gears 40, 41 and the control shaft 42 and is also supplied through the axial passage 20a and radial holes 20b, 20c to lubricate both the bearings 27 and 28.

Figure 4:
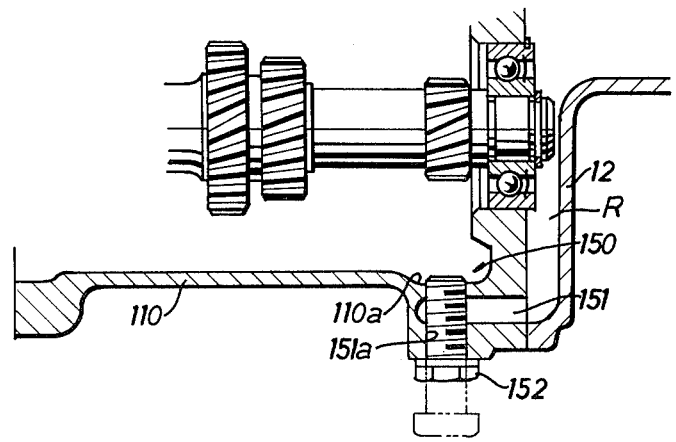
FIG. 4 is a sectional view of a modification of the transmission casing of FIG. 1.

As is seen in FIG. 4, the transmission casing 10 may be replaced with another transmission casing 110 which has a recess 110a forming the bottommost portion thereof. Provided under the recess 110a is an oil flow control device 150 which includes a horizontal cavity 151 formed in the bottom wall of casing 110, a vertical threaded hole 151a formed across the cavity 151, and a drain plug 152 threaded into the vertical hole 151a. The cavity 151 opens toward the lubricant chamber R of housing 12 to be opened toward the interior of casing 110 when the plug 152 is partly released.

In combination with the transmission casing 110, when the drain plug 152 is removed, the vertical hole 151a serves as a drain port to drain off the waste lubricating oil from the casing 110 and the housing 12. After exhaustion of the waste oil, the drain plug 152 is partly threaded into the vertical hole 151a, as shown by an imaginary line in FIG. 4, and an amount of fresh oil is fed into the casing 110 from the filler port. Then, the fresh oil flows along the bottom of casing 110 and flows into the lubricant chamber R through the cavity 151 to cause equality of the level of fresh oil in casing 110 and housing 12. After each of the casing 110 and housing 12 is filled with fresh oil, the plug 152 is fully threaded into the vertical hole 151a to block the oil communication between the casing 110 and the housing 12, and the filler port is closed by the filler plug 14.

In practice of the present invention, it is further noted that the plug 52 or 152 may be replaced with a plug laterally threaded into the bottom wall of housing 12 to open and close the oil communication between the casing 10 or 110 and the housing 12.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a power transmission unit for a motor vehicle comprising:

a transmission casing shaped to conform with a change-speed gearing contained therein, said change-speed gearing including an output mainshaft rotatably supported from an upright end wall of said casing; and an extension housing secured in a fluid-tight manner at its upright front seating face to said upright end wall to contain one end of said mainshaft extending therein from said upright end wall, said extension housing forming a lubricant chamber in open communication with the interior of said casing through the upper portion of said upright end wall;

the improvement wherein the bottom wall of said transmission casing is formed therein with a cavity opening toward said lubricant chamber and with a through hole across said cavity to open said lubricant chamber toward the interior of said casing and exterior therethrough; and a plug element is coupled with said through hole in a fluid-tight manner to close said through hole, whereby when said plug element is partly released outwardly, said lubricant chamber is communicated with the interior of said casing through said cavity and said through hole.

2. A power transmission unit as claimed in claim 1 wherein said through hole is a threaded vertical hole formed by drilling through the bottom wall of said transmission casing, and said plug element is a threaded plug coupled with said threaded vertical hole.

3. A power transmission unit as claimed in claim 1, wherein a drain plug is additionally threaded into the bottommost portion of said transmission casing to drain off lubricating oil from said casing and said housing.

4. A power transmission unit as claimed in claim 1, wherein said mainshaft is provided therethrough with an axial oil passage opening at its one end into said lubricant chamber and at its other end toward the interior of said transmission casing to supply lubricating oil from said lubricant chamber to a bearing carried on said mainshaft.

5. A power transmission unit as claimed in claim 1, wherein said mainshaft is supported by a sealed bearing carried on the upright end wall of said casing to store an amount of lubricating oil within said lubricant chamber.

6. A power transmission unit as claimed in claim 1, wherein the upright end wall of said casing is provided at the upper portion thereof with a through hole communicating the interior of said casing into said lubricant chamber and is further provided with an oil receiver surrounding the lower and side opening edges of said second-named through hole within said casing.

7. A power transmission unit as claimed in claim 1, wherein said plug element is a drain plug to be removed from said through hole to drain off lubricating oil from said casing and said housing.

8. A power transmission unit as claimed in claim 1 or 2, wherein said cavity is a horizontal cavity at the bottom of said upright end wall of said casing, and said through hole is formed vertically to said horizontal cavity.

* * * * *